United States Patent
Lacaze

(10) Patent No.: US 7,928,623 B2
(45) Date of Patent: Apr. 19, 2011

(54) GENERATOR WITH HIGH PHASE ORDER

(75) Inventor: Alain Lacaze, Essert (FR)

(73) Assignee: ALSTOM Technology Ltd, Baden (CH)

(*) Notice: Subject to any disclaimer, the term of this patent is extended or adjusted under 35 U.S.C. 154(b) by 0 days.

(21) Appl. No.: 11/863,533

(22) Filed: Sep. 28, 2007

(65) Prior Publication Data

US 2008/0079400 A1    Apr. 3, 2008

Related U.S. Application Data

(63) Continuation of application No. PCT/EP2006/060657, filed on Mar. 13, 2006.

(30) Foreign Application Priority Data

Mar. 31, 2005   (CH) ...................................... 0586/05

(51) Int. Cl.
H02K 1/00   (2006.01)
H02K 3/00   (2006.01)

(52) U.S. Cl. ..... 310/179; 310/180; 310/68 R; 310/68 A; 310/68 B; 310/68 C; 310/68 D; 310/68 E; 310/201

(58) Field of Classification Search .................. 310/179, 310/180, 216, 68 A–68 E, 68 R, 201; H02K 1/00, H02K 3/00
See application file for complete search history.

(56) References Cited

U.S. PATENT DOCUMENTS

| 2,666,820 | A | * | 1/1954 | Rolf | 200/19.2 |
| 2,818,515 | A | * | 12/1957 | Dolenc | 310/57 |
| 3,152,273 | A | * | 10/1964 | Harrington | 310/198 |
| 4,072,873 | A | | 2/1978 | Nottingham | |
| 4,161,680 | A | * | 7/1979 | Akamatsu | 318/722 |
| 4,218,646 | A | * | 8/1980 | Akamatsu | 322/72 |
| 4,385,254 | A | | 5/1983 | Vakser et al. | |

(Continued)

FOREIGN PATENT DOCUMENTS

DE   2630171   1/1977

(Continued)

OTHER PUBLICATIONS

Decision Regarding the Issue of the Letters Patent for Application No. 2007140306/09(044116). Feb. 26, 2009.

(Continued)

*Primary Examiner* — Quyen Leung
*Assistant Examiner* — John K Kim
(74) *Attorney, Agent, or Firm* — Leydig, Voit & Mayer, Ltd.

(57) ABSTRACT

An apparatus for producing electrical power from mechanical power, includes a generator with a rotor and a stator for conversion of mechanical power to a polyphase alternating current having more than three phases. The stator has a stator core with a cylindrical stator bore and a plurality of parallel stator slots disposed at a distance from one another, extending axially along a length of the stator core and being open towards the stator bore. A plurality of stator winding bars are disposed in the stator slots so as to form delta-connected windings for producing the polyphase alternating current. A static frequency converter in the form of a matrix converter converts the polyphase alternating current to a desired output alternating current, wherein the stator is a polygonal stator having external winding connections that are bridged, wherein inputs to the matrix converter are connected to end connections of the winding bars. For k stator slots and for a polyphase output with m phases, every k/m-th end connection of the winding bars or evolvent is connected, forming one phase of the polyphase stator output.

11 Claims, 7 Drawing Sheets

U.S. PATENT DOCUMENTS

| | | | |
|---|---|---|---|
| 4,439,823 A | 3/1984 | Gyugyi et al. | |
| 4,642,751 A | 2/1987 | Schauder | |
| 4,751,448 A | 6/1988 | Auinger et al. | |
| 5,028,804 A | 7/1991 | Lauw | |
| 5,053,689 A | 10/1991 | Woodson et al. | |
| 5,594,636 A | 1/1997 | Schauder | |
| 5,789,840 A | 8/1998 | Gould et al. | |
| 5,965,965 A * | 10/1999 | Umeda et al. | 310/52 |
| 6,188,591 B1 | 2/2001 | Rueter et al. | |
| 6,417,592 B2 * | 7/2002 | Nakamura et al. | 310/184 |
| 6,519,170 B2 * | 2/2003 | Lacaze et al. | 363/152 |
| 6,844,644 B2 * | 1/2005 | Arimitsu | 310/114 |
| 6,864,611 B1 * | 3/2005 | Wobben | 310/162 |
| 7,075,206 B1 * | 7/2006 | Chen | 310/179 |
| 7,075,265 B2 * | 7/2006 | Edelson | 318/801 |
| 2002/0093840 A1 * | 7/2002 | Lacaze et al. | 363/152 |
| 2003/0085627 A1 | 5/2003 | Lipo et al. | |
| 2003/0230953 A1 * | 12/2003 | Koike et al. | 310/260 |
| 2004/0090130 A1 * | 5/2004 | Kaneko et al. | 310/58 |
| 2008/0079400 A1 * | 4/2008 | Lacaze | 322/20 |

FOREIGN PATENT DOCUMENTS

| | | |
|---|---|---|
| DE | 3123800 | 8/1983 |
| DE | 10051222 | 4/2002 |
| EP | 1199794 | 4/2002 |
| RU | 2222863 C2 | 1/2004 |
| RU | 36922 U1 | 3/2004 |
| SU | 603087 A1 | 4/1978 |
| SU | 771844 A1 | 10/1980 |
| SU | 1283938 A1 | 1/1987 |
| SU | 1319229 A1 | 6/1987 |
| SU | 1379937 A1 | 3/1988 |

OTHER PUBLICATIONS

Decision Regarding the Issue of the Letters Patent for Application No. 2007140306/09(044116). Feb. 26, 2009.

* cited by examiner

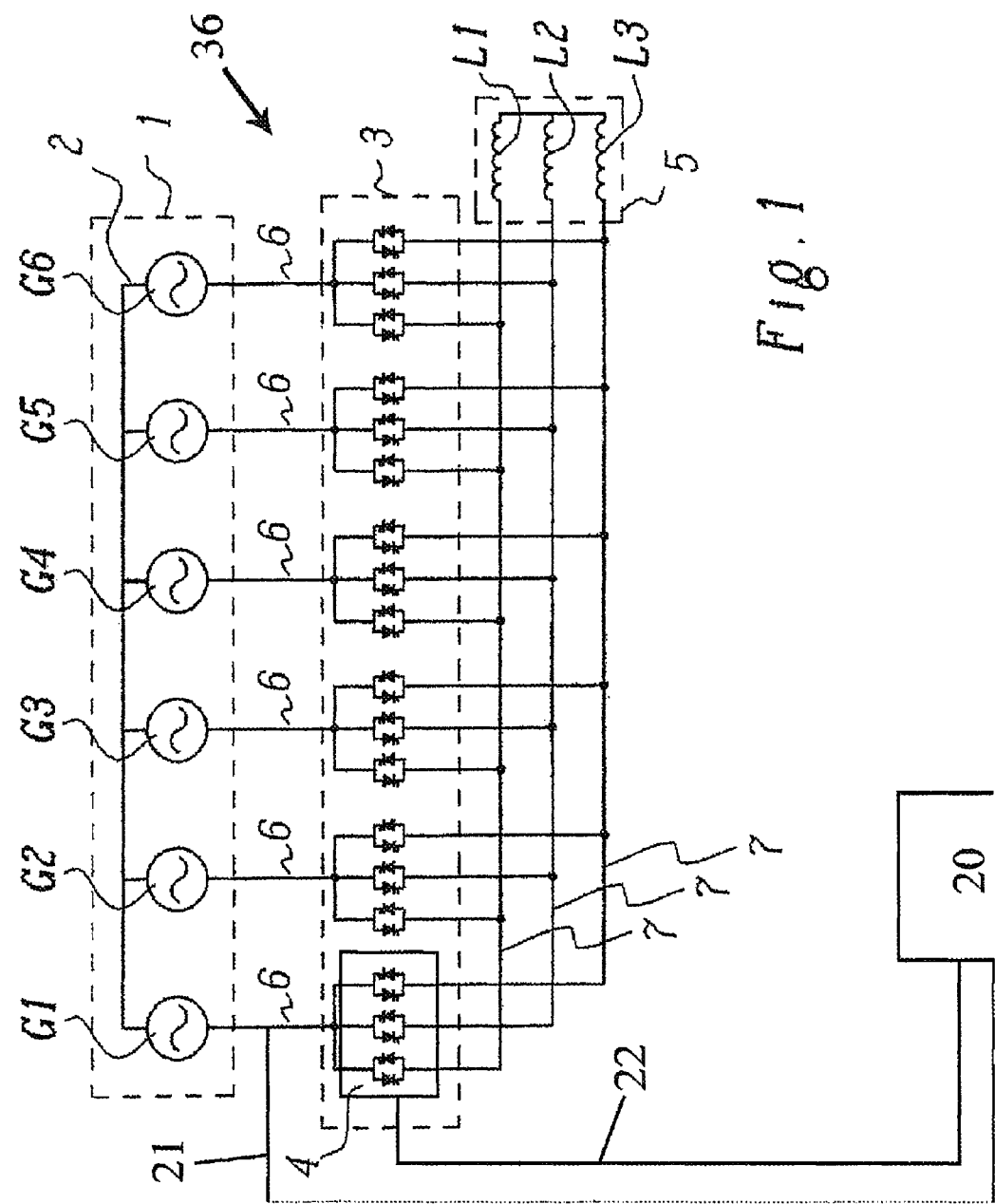

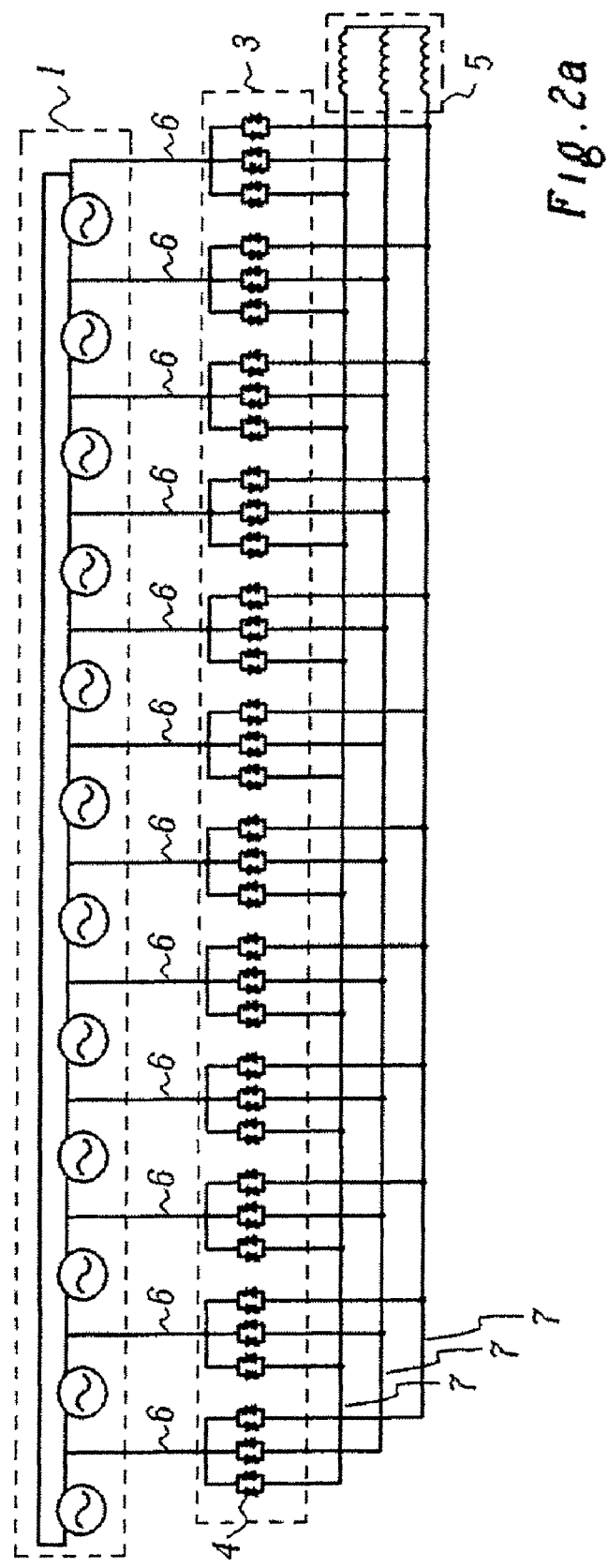

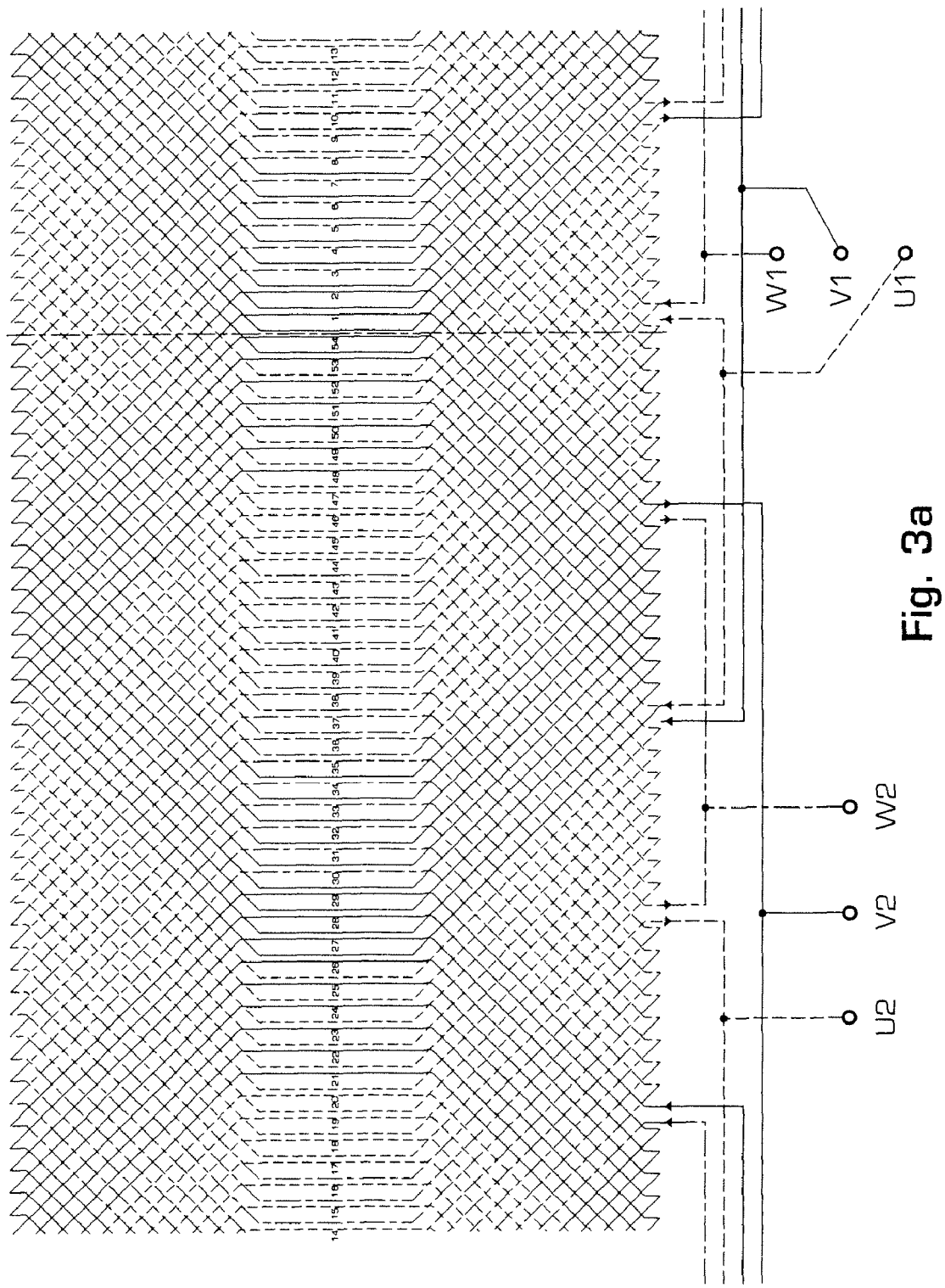

GENERATOR WITH HIGH PHASE ORDER

This application is a continuation from International Application No. PCT/EP2006/060657, filed on Mar. 13, 2006, which claims priority to Swiss Patent Application No. 00586/05, filed on Mar. 31, 2005. The entire disclosure of both applications is incorporated by reference herein.

The present invention relates to the field of high phase order generator equipment. In particular it relates to power generation with a synchronous generator which supplies via a static frequency converter and which produces a frequency deviation from the mains frequency.

The present invention more particularly relates to a device for the production of electrical power from mechanical power comprising a generator for conversion of mechanical power into a polyphase alternating current and a matrix converter for the conversion of the polyphase alternating current into the desired alternating output current. Furthermore, the invention relates to a method for operating such a device.

BACKGROUND

In power generation, at a specified output, an increase of the rotary speed of a turbine is associated with a decrease in size and costs. Efficiency, too, can be improved. So far, power generation turbines up to 70 MW are connected to generators by way of gearing arrangements, so as to allow operation at higher turbine rotary speeds. As the output increases, the use of gearing arrangements becomes increasingly difficult due to reliability reasons. In such cases, the turbine is operated at synchronous speed.

The use of static frequency converters (power electronics) represents an alternative providing many advantages such as reduced costs of the generator in agreement with a constant product of volume and rotational speed, standardised generators for both 50 and 60 Hz, adjustable speed which allows restoration of the partial-load efficiency of the turbine, substantial reduction in noise, clean (oil-free) cooling, etc.

Both in the case of power generation and in the case of drives, a reduction in losses of the static frequency converters would bring about substantial cost savings. A reduction of the losses would above all have a bearing on investment costs because cooling accounts for a substantial part of the total costs of the converter.

Static frequency converters exist both with indirect AC/DC/AC conversion and with direct AC/AC conversion.

The indirect conversion (AC/DC/AC) is caused by generating a direct current or a direct voltage from the three-phase source (mains in the case of motors; generator in the case of power generation). Subsequently, the direct current or the direct voltage is converted back to an alternating current by means of an inverter. An inductance (current source converter) or a capacitor bank (voltage source converter) are switched into the intermediate circuit so as to reduce the ripple component of the current or the spikes.

Today's converters make use of thyristors. If natural commutation of the thyristors is possible, the losses in the converter are reduced. Voltage source converters use GTOs with their inherent high switching losses, as well as IGBTs or IGCTs. The power capability of the individual components is less than that of thyristors, consequently, a larger number of components are required for a specified voltage and a specified current. Voltage source converters can benefit from the use of pulse-width modulation techniques, which improve the shape of the current curves and reduce the harmonics. The higher the switching frequencies the better, except with regard to losses and dielectric fatigue. The current can largely be produced sine-shaped so that a derating of power of the electrical machine is avoided.

Direct conversion (AC/AC) is for example possible by means of a so-called cyclo-converter. Direct conversion provides significant advantages from the point of view of the electrical machine, because the current is more or less sine-shaped rather than chopped direct current. It reduces the losses that occur additionally in the electrical machine and it also prevents pulsating torques.

However, the use of a 3-phase cyclo-converter limits the achievable frequency range to 0-⅓ of the input frequency. A 3-phase cyclo-converter is made of 3 single phase cyclo-converters, each processing ⅓ of the power in balanced operation. Exceeding the ⅓ limit in frequency ratio results in a strongly unbalanced operation. In this case each single phase cyclo-converter should be designed for more than ⅓ of the full power. The overdimensioning can be up to a factor of 3 in power rating.

Another possibility of direct conversion is provided by a so-called matrix converter in which each phase of a multi-phase source (generator or mains) is connected or connectable with each phase of a multi-phase load (mains, passive load, motors, etc.) by a bi-directional switch. The switches consist of an adequate number of thyristors to withstand the differential voltage between the phases, and the phase currents, and to allow current reversal. They can be regarded as truly bi-directional components with the options of jointly using additional wiring such as snubbers or the gate unit power supplies for the drive pulses for the antiparallel components.

The switches are arranged in a (m×n)-matrix at m phases of the source and n phases of the load. This provides the option of establishing any desired connections between the input phases and the output phases; however at the same time it has the disadvantage in that certain switching states of the matrix must not be allowed since otherwise for example a short circuit would result. Furthermore it is desirable to carry out commutation from one phase to another phase such that the lowest possible switching losses result.

U.S. Pat. No. 5,594,636 describes a matrix converter and a process for its operation in which commutation between the phases is partly carried out as a natural commutation, with a forced commutation where natural commutation is not possible. Although with this type of selection, switching losses are reduced due to natural commutation, those switching losses that arise from forced commutation still remain. Furthermore, the possible forced commutation necessitates the use, in all positions on the matrix, of components that can be switched off. This considerably increases the switching expenditure.

However, it is possible to operate a matrix converter in a way that only natural commutations are being used. This can be achieved by only allowing the switching over from a selected connected phase of the generator to a selected not connected phase of the generator only if certain conditions are met. Such a matrix converter as well as a mode of its operation has been disclosed in DE 10051222 A1 as well as in the corresponding European application EP-A-1199794. While being of high efficiency and versatility, the concept of a matrix converter and its mode of operation generally suffer for certain applications, from weaknesses with respect to harmonic distortion and with respect to possible frequency ratios.

SUMMARY OF THE INVENTION

An object of the present invention is to provide an improved device for the generation of electrical power from mechanical power comprising a generator with a rotor 32 and a stator 30 for conversion of mechanical power into a polyphase alternating current, preferably comprising a static frequency converter, as e.g. a matrix converter, for the conversion of the polyphase alternating current into the desired alternating output current, as well as to provide an improved mode of operation of such a device.

The present invention provides a generator set-up wherein the stator comprises a stator core with a cylindrical stator bore therein, said stator core having a plurality of spaced parallel stator slots 38 extending axially along the length of said stator core and opening into said stator bore, a plurality of stator winding bars 34 being inserted into the stator slots. In such a stator the windings are connected to give rise to delta-connected phases of the polyphase alternating current, and the polyphase alternating current has more than three phases.

A feature of the invention is therefore the fact that by using a so-called high phase order generator and the corresponding high number of phases of the polyphase alternating current, harmonic distortions can be reduced significantly. Due to the winding consisting of bars, the construction is very simple and sturdy since the connections points of the output phases of the stator can be chosen to be the bar end connections of the windings at one or both sides of the stator. The main arguments that should be considered to optimise the number of phases of the polyphase alternating current are:

- the phase number should preferably be a multiple of 3, otherwise the currents and voltages are permanently unbalanced.
- a large number of phases of the polyphase alternating current leads to a high commutation frequency.
- a high commutation frequency reduces harmonic distortion.
- the commutation frequency is limited because of the duration of commutations.
- the total number of switches is proportional to the number of phases. The cost of the converter depends directly on it.
- the large number of phases means a very low duty cycle in the m-phase source. The utilisation of the generator is then rather poor and its cost rather high.

Therefore, the use of 6 phases of the polyphase alternating current according to the state of the art (which however are star-connected), which is convenient to obtain (double winding transformer, 6-phase generator), is often satisfactory. However, if harmonic distortions have to be reduced, higher numbers of phases prove to be superior. The solution described here implies the tapping of the bar windings of delta-connected phases and aims at providing an attractive solution in that the phase number becomes large, e.g. 18, 24, 36 or more. Indeed the solution can be applied to any phase number up to the slot number, or even up to the bar number.

Usually, alternating current generators are star connected. For a high phase order generator and a winding composed of bars it however proves to be advantageous to use delta connected stator windings. The delta connected stator implicates automatically a so-called polygonal stator winding. In a polygonal stator winding, the individual windings are appropriately connected in series, subsequent bar connecting points forming m vertices or volutes, theoretically defining a m-phase winding which is connected to the input of the preferably used matrix converter. Therefore, standard generator stators can be modified in order to be operated according to the invention. This can be achieved by bridging the external winding connections and by connecting the inputs of the matrix converter to the end connections of the bars. In order to turn a 3-phase star connected stator into a polyphase delta connected or polygonal one, the circular rings which connect coils to terminals are therefore removed and the bars ends which were connected to the circular rings are welded together. The stator winding therefore becomes fully symmetrical and forms one single closed coil.

In power generation the desired alternating output current normally has 1, 2, 3 or 6 phases at the output of the converter. According to the invention, preferably the polyphase stator of the generator has more than 8 phases, wherein the number of phases of the polyphase stator is a multiple of 3 preferably. Preferably, the polyphase stator has 9, 12, 15, 18, 21 or 24 phases. But also higher numbers of phases like 36, 54 or 108 are possible, thereby increasing the number of necessary switching elements in the matrix converter but also reducing the harmonic distortions and increasing the versatility with respect to frequency ratio. In principle, the number of phases of the polyphase stator may even equal the number of stator slots.

According to another embodiment, in the matrix converter m phases of the polyphase alternating current of the generator are converted into alternating output current with n (n<m) phases of a grid or load by means of a multiple number of controllable bidirectional switches arranged in an (m×n) matrix such that each of the m phases of the polyphase alternating current is connected to each of the n phases of the alternating output current via at least one bidirectional switch. Typically in this case the bidirectional switches are controlled by a control system 20, selectably connecting m inputs with n outputs, wherein first means 21 for determining the signs of the currents in the inputs, and second means for determining the signs of the voltages between the inputs are provided, and wherein the first and second means are in active connection with the control system. The bidirectional switches are connected as usual to the control system via a signal line 22 by way of which information concerning the switch state of the switches is transmitted to the control system. The bidirectional switches may comprise antiparallel-switched thyristors.

In particular in case of a very large number of phases of the polyphase alternating current of the generator, it proves to be advantageous to integrate the power electronics into the stator. The matrix converter 36 can therefore at least partially be integrated into the stator of the generator or is directly attached to the generator. Preferably the part of the matrix converter, which is contained in the stator, may even be disposed in the stream of cooling fluid that is used to cool the generator.

Additionally, the present invention relates to a method for operating a device as described above, i.e. a m-phase generator feeding a n-phase grid/load. The device has a matrix converter in which m phases of the polyphase alternating current of the generator are converted into an alternating current with n (n<m) phases by means of alternatively connecting those phases via a multiple number of controllable bi-directional switches arranged in an (m×n) matrix, is operated such that n phases of the generator are always connected with the load while (m−n) phases of the generator are not connected with the load. The device is characterised in that switching over from a selected connected phase of the generator to a selected non-connected phase of the generator only takes place if the conditions as outlined in the document DE 100 51 222 A1 as well as in the corresponding European application EP-A-1199794 are fulfilled. As pertains to the operation of the matrix converter forming part of the device according to the invention, the disclosure of those two documents shall be explicitly included into the present specification.

Furthermore the present invention relates to a method of modification or repowering of a star connected low phase-order stator. The method is characterized in that the star-connected stator, which stator comprises a stator core with a cylindrical stator bore therein, said stator core having a plurality of spaced parallel stator slots extending axially along the length of said stator core and opening into said stator bore, a plurality of stator winding bars being inserted into the stator slots, is modified using the steps of connecting the external winding connections of the stator and using a selection or all bar connections as polyphase stator terminals.

Preferably, sets of bidirectional switches forming a matrix converter are directly connected to the selected bar connections. If the stator comprises k stator slots, and the polyphase stator comprises m phases, preferably every k/m-th volute is connected to form a phase of the polyphase stator terminal. The circular rings that connect coils to terminals can easily be removed and the bars ends that were connected to the circular rings can be welded together.

Further embodiments of the present invention are outlined in the claims.

BRIEF DESCRIPTION OF THE FIGURES

In the accompanying drawings preferred embodiments of the invention are shown in which:

FIG. 1 is a schematic display of a generator with matrix converter according to the state-of-the-art;

DETAILED DESCRIPTION

Figure 2B:
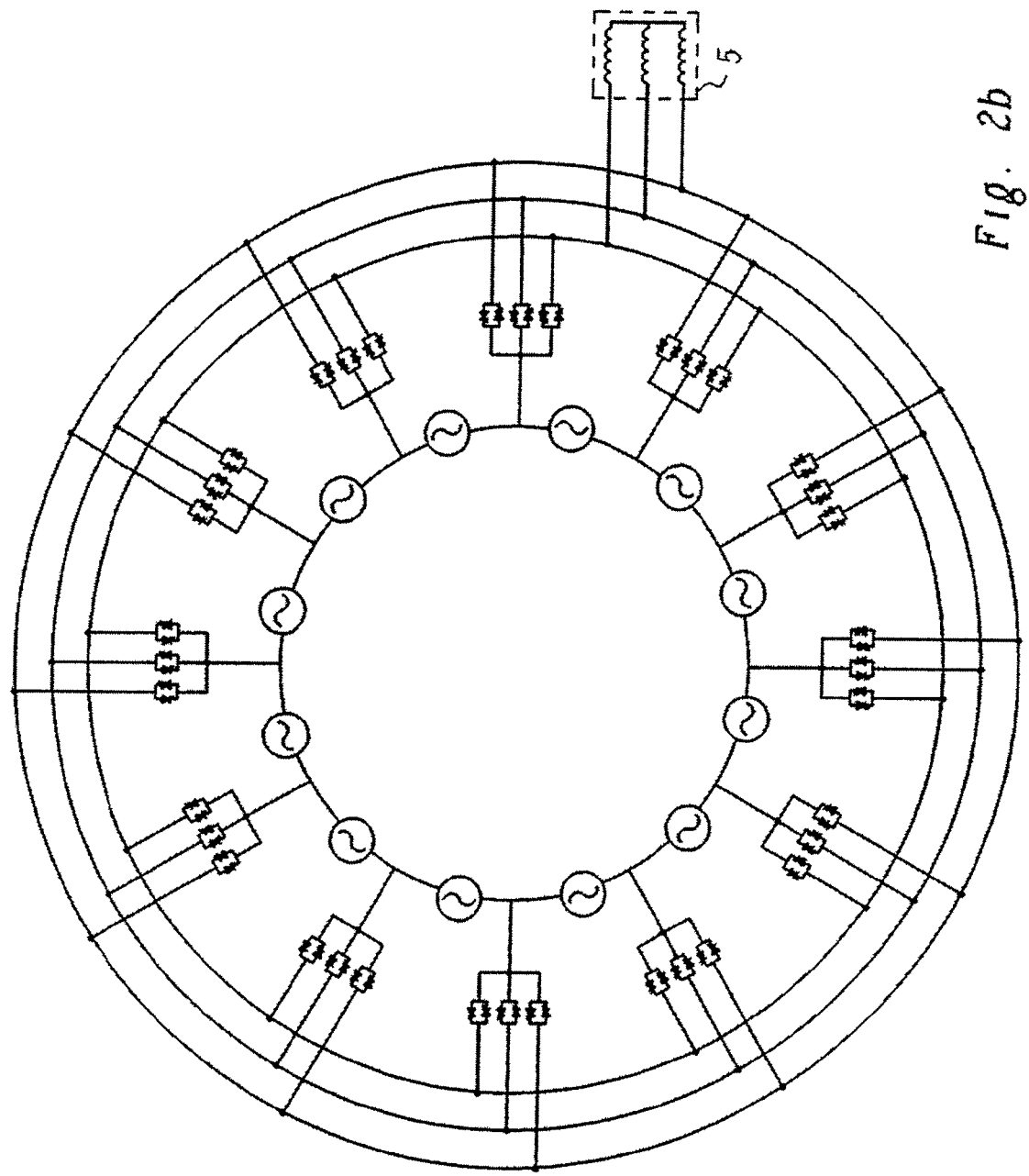
FIG. 2 a) is a schematic display of a high phase order generator with matrix converter according to the invention and b) the same connectivity in a different display showing the polygonal character.

Referring to the drawings, which are for the purpose of illustrating the present preferred embodiments of the invention and not for the purpose of limiting the same, FIG. 1 shows the generator set-up, in which a generator 1 with six generator phases G1 to G6, which are star connected (reference numeral 2), is connected to a matrix converter 3. The polyphase alternating current 6 comprising six phases (m=6) therefore gives the input of the matrix converter 3. Each of these phases is individually connected via a bidirectional switch 4 to any of the three alternating output current phases 7 (n=3). This arrangement of the bidirectional switches 4 leads to a 6×3 matrix of switches, or more generally, for m phases of the polyphase alternating current 6 and for n phases of the alternating output current 7, the matrix converter comprises an m×n matrix of bidirectional switches. By use of corresponding controls it is therefore possible to connect any input phase with any output phase at any time, depending on which output pattern is desired for the alternating output current 7. The alternating output current 7 is connected as usual to a grid (phases L1, . . . L3) by means of transformer 5.

A matrix converter according to FIG. 1 and a preferred mode of operation of such a matrix converter is disclosed in DE 100 51 222 A1 as well as in the corresponding European application EP-A-1199794.

For many concerns, like harmonic distortion or frequency ratio, it is preferable to use numerous phases, i.e. much more than 6. A large number of phases may however result in a poor utilisation of both the stator winding and the power switches.

There is a way around this problem of poor utilisation, which is to consider a polygonal stator. A polygonal winding is conveniently obtained by connecting (short-circuiting) the external winding connections. This is easily possible due to the fact that a stator construction is used, in which the windings are bar windings, and in which the volutes that are present in such a construction are available for connecting the switches thereto. The volutes in this case for example take forms as e.g. disclosed in DE-A-31 23 800, or as in DE 26 30 171 or as given in FIG. 1b of U.S. Pat. No. 5,789,840. Then the switches can simply be connected to the extremity of volutes. In principle the number of phase can be as high as the number of stator slots (i.e. several tens). If for example in each stator slot two winding bars are located, it is in principle even possible to have a number of phases which is twice as high as the number of stator slots.

It has to be mentioned that it is also possible to use a multiphase transformer, which for example connects a six phase output of the matrix converter to a 3-phase grid or load in power generation with a high phase order generator.

The matrix converter could therefore be either m×3 or m×6 phase, in the usual case with 3-phase grid, load or mains. If a 3 phase connection, i.e. a m×3 matrix converter, is used then the effective electromotive force is reduced (the winding coefficient is reduced). The specific output power is slightly reduced and the generator should be oversized (ca. 15%).

If a 6 phase output is used then the output power is exactly the same as with the original winding. The penalty is now on the bus-bars and on the main transformer. A special design of bus-bars will substantially reduce the additional cost. The additional costs on the step-up transformer for a double winding are marginal. A 6 phase output is very attractive when the line current is large and exceeds the thyristor rating.

FIG. 2 correspondingly shows a possible set-up with a high phase order generator 1 with 12 phases. The embodiment described here aims at providing an attractive solution when the phase number becomes large, e.g. 24, 36 or more. Indeed the solution can be applied to any phase number. The embodiment is explained for the case of a m-phase generator connected by the matrix converter to a 3 phase network (n=3). The generator configuration as given for 12 phases of the polyphase alternating current 6 and 3 phases of the desired alternating output current 7 is very similar to a state-of art standard synchronous AC generator. The discrepancy lies on the stator bars end-winding connections, which must be modified.

First, the circular rings, which connect coils to terminals, are removed. The bars ends that were connected to the circular rings are welded together, as any bar that form the coils. By doing so, the stator winding is fully symmetrical, and forms one single closed coil. Indeed there are no longer special inter-phase lugs. As well there is no need for first and last coil bars to be special.

Second, some or possibly all the welded connections are connected to a bidirectional switch 4. The resulting apparent phase number m of the polyphase alternating current could be 3, 4, 5, 6 . . . up to the number of bars, i.e. twice the number of slots if both the driven and non driven end are equipped with switches.

In principle any standard generator could be modified to be used with the new configuration.

Usually AC generators are star connected, but in this case the generator is delta connected. The stator configuration has some similarity with the rotor winding of a DC motor.

The basic principle of operation in such a set-up remains the same, and is applied for a very large number of phases.

The present concept is also particularly suitable for repowering of a stator. This can be seen from FIG. 3. FIG. 3a) shows the standard connectivity of a star-connected stator with 54 stator slots, connected to lead to 6 phases of the polyphase alternating current 6. These phases are indicated in FIG. 3 with U1, V1, W1 and U2, V2, W2. Each of the stator slots is provided with 2 stator bars.

Figure 3B:
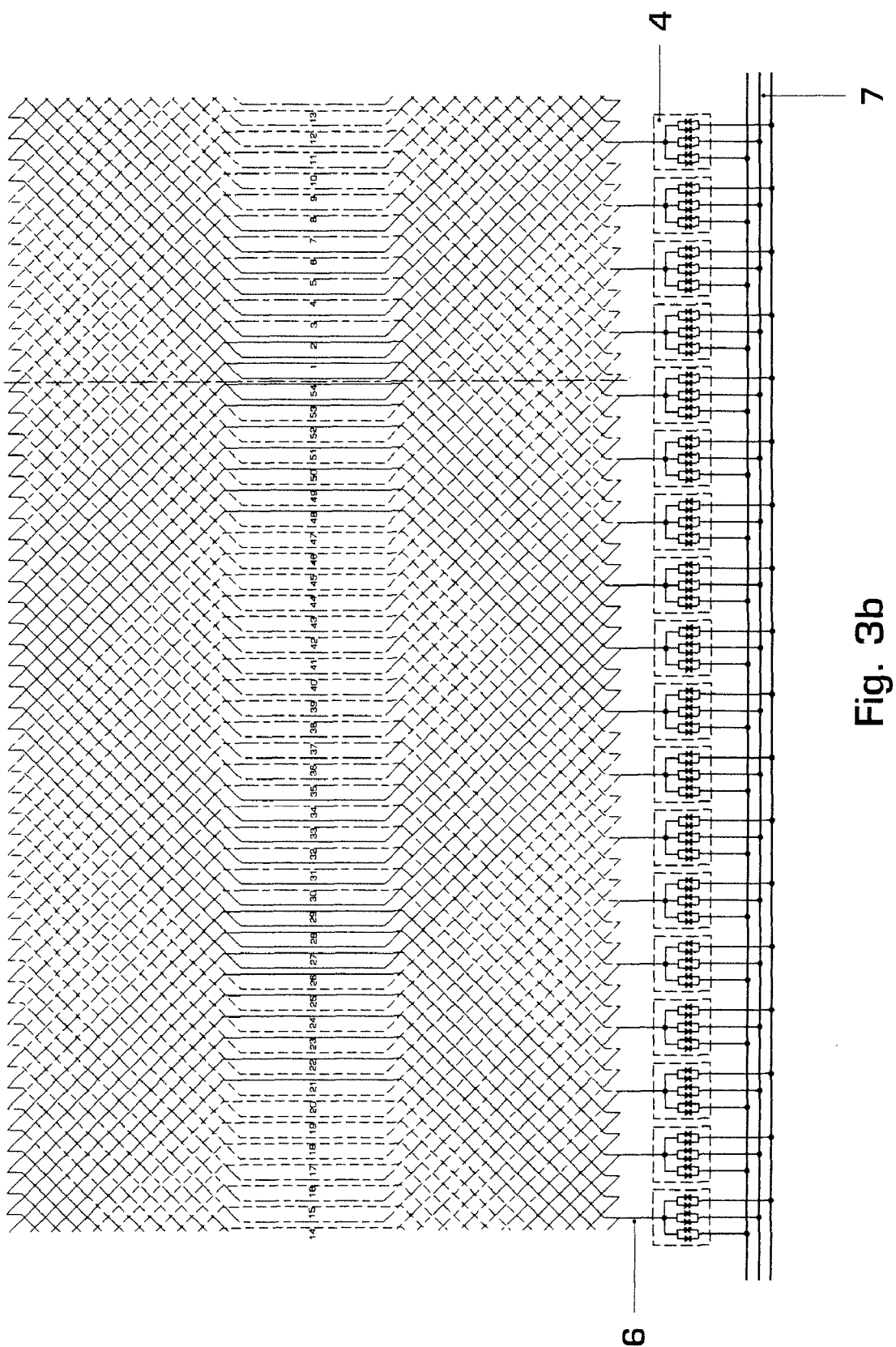
FIG. 3 a) shows a schematic connectivity of a 3-phase stator with star-connected stator windings according to the state-of-the-art with 54 slots, b) shows a schematic connectivity of a stator with delta-connected stator windings including sets of bidirectional switches directly connected to the volutes; c) shows a schematic perspective view of the terminal region of a stator with two winding bars per stator slot.
Figure 3:
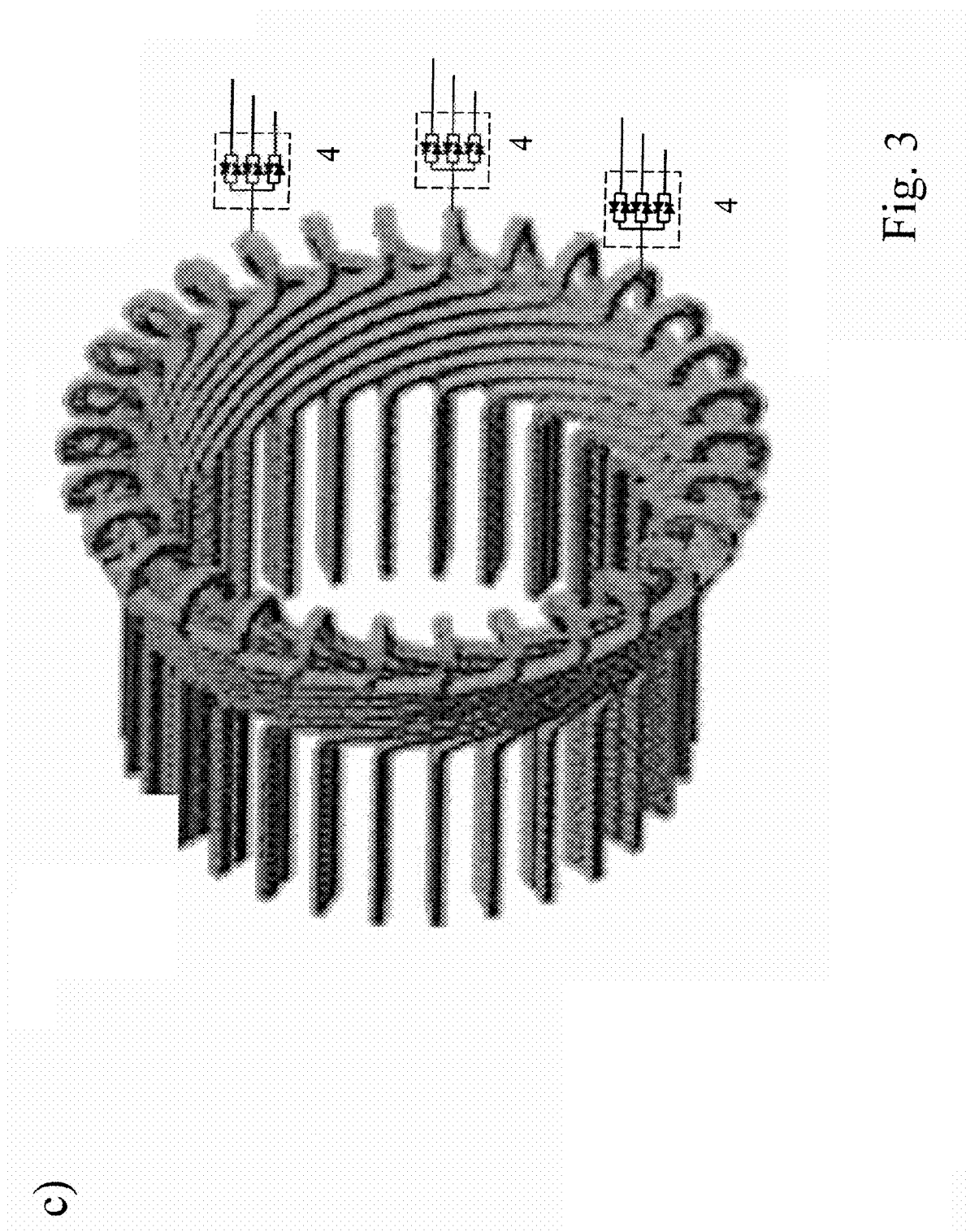

Such a stator can be turned into a delta-connected stator according to the invention as indicated by the connectivity in FIG. 3b) in that where previously the phases of the polyphase alternating current 6 were connected, adjacent outputs are connected. In other words, at the positions in FIG. 3a) where 2 black dots are immediately adjacent to each other, those connections are joined. Now the volutes are individually connected to a set of bidirectional switches. If a 54 phase output is desired, each of the volutes is connected to a bidirectional switch. In FIG. 3b) only every third volute is connected to a set of bidirectional switches, leading to a polyphase alternating output with 18 phases. Those 18 phases are connected to the lines of the alternating output current by means of the sets of bidirectional switches. The bus-bars between the polyphase stator and the matrix converter have a rather low duty cycle, inversely proportional to the phase number, therefore the bus-bar can be downsized. Standard medium voltage cables can be used instead of bus-bars, resulting in a substantial cost saving.

FIG. 3c) schematically indicates how the end winding region of a stator with bar windings looks like, and where the output phases are taken from the extremities of the volutes. To this end, at some of the volutes symbolically sets of bidirectional switches are indicated. Also visible in FIG. 3c) is the fact that a stator modified according to the invention is fully symmetric.

As a result of the large number of phase the apparent commutation frequency will be high. The generated harmonics on voltage will be higher in frequency and less in amplitude. The corresponding harmonic current will be further reduced because of the phase inductance of the generator.

Figure 4A:
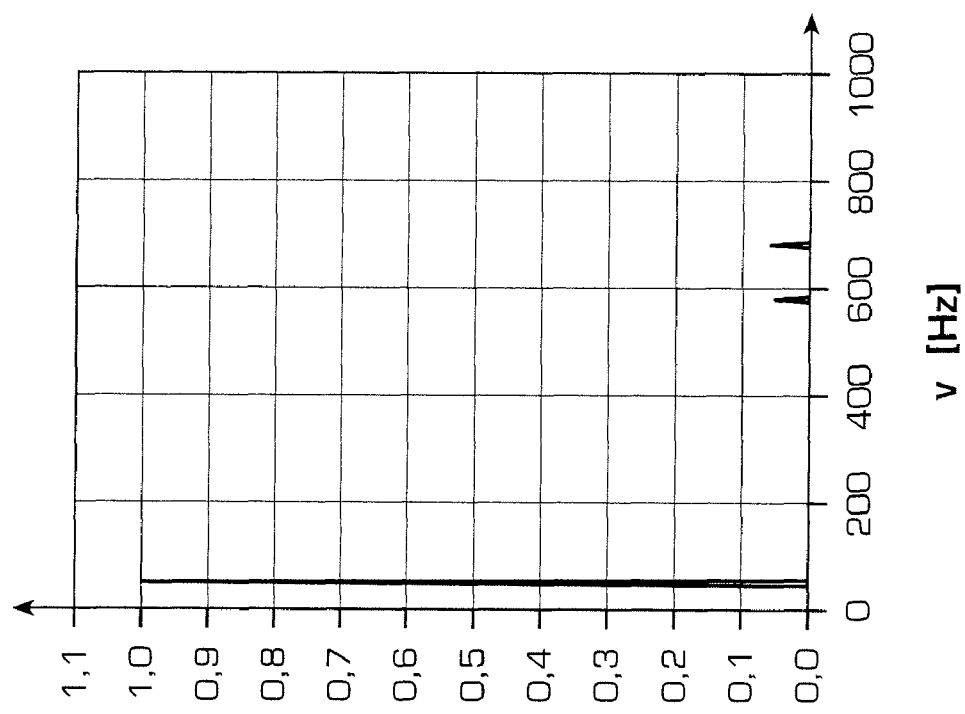
FIG. 4 shows the theoretical frequency spectrum of the alternating output current of the matrix converter for a 6 phase generator, i.e. for polyphase alternating current with 6 phases (a) and for an 18 phase generator, i.e. for polyphase alternating current with 18 phases (b).
Figure 4B:
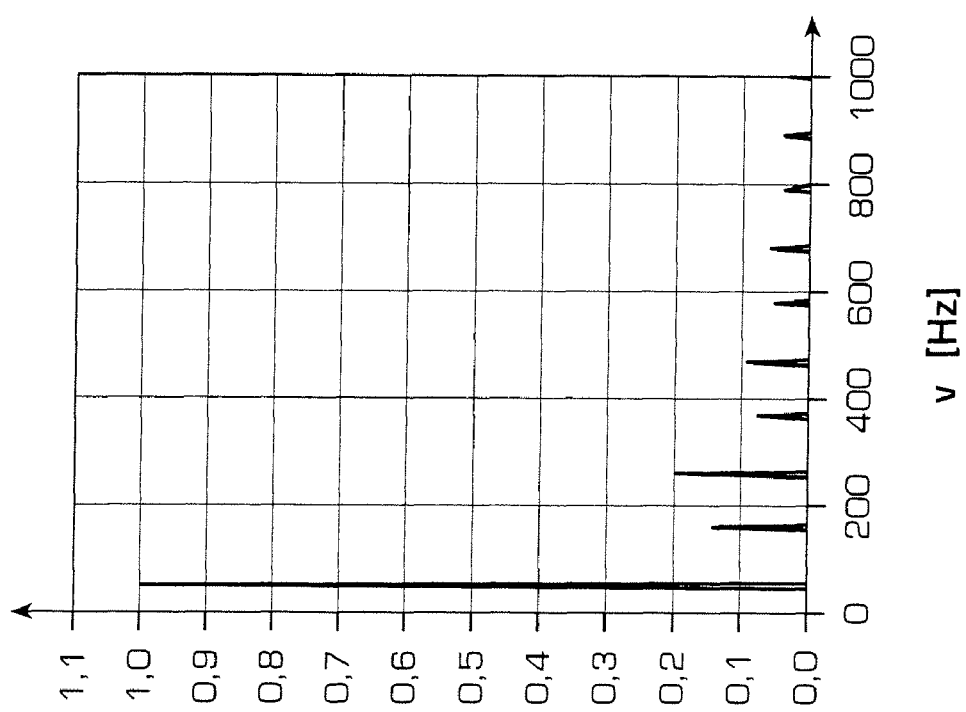

The plots given in FIG. 4 show the theoretical spectrum with a 6 phase (a) and an 18 phase (b) generator (e.g. one as schematically drawn in FIG. 3b). One can see in FIG. 4a) that for 6 phases of the polyphase alternating current harmonics with an amplitude of 14% are obtained at the first order harmonic and of 20% at the second order harmonic.

Clearly superior behaviour is obtained for 18 phases of the polyphase alternating current (b), with less than 10% at fifth and sixth order harmonics.

The number of commutation per unit time will increase proportionally to the phase number, therefore the time left between commutation will reduce proportionally to the phase number. In the meantime the duration of commutation will reduce in the same proportion, because the inductance or the energy involved is much less. By the end of day, the total time for commutations will be the same whichever the number of phase actually used.

The actual phase number can be changed dynamically during operation. Let's consider a 54 slot generator, which could be equipped to have 3×54 bidirectional switches 4. It can be operated as a 4, 6, 9, 12, 18, 27, 36 or 54 phase generator for symmetrical operation. In case of a switch failure any intermediate phase number can be used with limited impact on operating performance. The change in phase number is done by the control software of the matrix converter. In case of a switch failure the system can still be operated, provided the faulty switch is removed.

With the proposed winding scheme the current in a given bar of the stator is most of the time a real sine wave. The duty cycle of the stator winding is high. The commutations result in a very local modification of the magnetic field pattern. Therefore the armature reaction will be very close to the one of a synchronous generator.

Usually when a generator 1 is operated through a static frequency converter, the damper winding of the rotor has a heavy burden which exceeds the normal negative sequence specified by codes like IEC 34-4. The proposed configuration may not, correspondingly a standard rotor damper winding will be sufficient.

Valves, i.e. the switches (thyristors, IGBT, IGCT, GTO . . . ) are numerous. The new concept gives a large flexibility to optimise the individual valve rating and cost. The point is that the valves will permanently be used in pulsed operation.

Pulsed operation allows having rather large currents but with a low duty cycle, which exactly fits to the foreseen application.

What is claimed is:

1. An apparatus for producing electrical power from mechanical power, comprising:
   a generator with a rotor and a stator for conversion of mechanical power to a polyphase alternating current having more than three phases, wherein the generator is connectable to an electrical grid for providing power to the electrical grid;
   the stator having a plurality of parallel stator slots a plurality of stator winding bars being disposed in the stator slots, and being connected in series so as to form a polygonal generator for producing the polyphase alternating current; and
   a static frequency converter in the form of a matrix converter for conversion of the polyphase alternating current to a desired output alternating current, wherein the stator is a polygonal stator, wherein inputs to the matrix converter are connected to end connections of the winding bars, and
   wherein for k stator slots and for a polyphase alternating current with m phases, every k/m-th end connection of the winding bars is connected, forming one phase of the polyphase stator alternating current.

2. The apparatus as recited in claim 1, wherein the desired output alternating current has 3 or 6 phases, and wherein the polyphase alternating current has more than 8 phases (m).

3. The apparatus as recited in claim 2, wherein a number of phases (m) of the polyphase alternating current is a multiple of 3.

4. The apparatus as recited in claim 3, wherein the polyphase alternating current has 9, 12, 18, 21 or 24 phases.

5. The apparatus as recited in claim 1, wherein one or two stator winding bars is or are disposed in each stator slot.

6. The apparatus as recited in claim 1, wherein the matrix converter includes a plurality of bidirectional, controllable switches arranged in an (m×n) matrix such that each of the m phases of the polyphase alternating current is connected to each n phases of the desired output alternating current via at least one bidirectional switch and the bidirectional, controllable switches converts m phases of the polyphase alternating current of the generator to the desired output alternating current with n phases of a load, wherein n<m.

7. The apparatus as recited in claim 6, further comprising a control system controlling the bidirectional switches by connecting m inputs to n outputs in a selected manner, first means for determining a polarity sign of the currents at the inputs, and second means for determining polarity signs of voltages between the inputs, wherein the first and second means are actively connected to the control system.

8. The apparatus as recited in claim 7, further comprising a signal line connecting the bidirectional switches to the control system, information relating to the switching state of the switches being transmitted to the control system via the signal line.

9. The apparatus as recited in claim 6, wherein the bidirectional switches include anti parallel-connected thyristors or correspondingly arranged IGBTs, IGCTs or GTOs.

10. The apparatus as claimed recited in claim 1, wherein a number of phases (m) of the polyphase alternating current corresponds to a number of stator slots.

11. A method for producing electrical power from mechanical power comprising:
  converting mechanical power to a polyphase alternating current having more than three phases using a generator with a rotor and a stator, wherein the generator is connectable to an electrical grid for providing power to the electrical grid, wherein the stator has a plurality of stator winding bars disposed in stator slots, the winding bars being connected at their ends in series so as to form a polygonal generator;
  converting the polyphase alternating current to a desired output alternating current using a static frequency converter in the form of a matrix converter, wherein the stator is a polygonal stator, and wherein inputs to the matrix converter are connected to end connections of the winding bars such that, for k stator slots and for a polyphase alternating current with m phases, every k/m-th end connection of the winding bars is connected to form one phase of the polyphase alternating current; and
  switching from a selected connected phase of the generator to a non-selected non-connected phase of the generator when $$I_k*(V_k-V_l)*K_{ijkl}<0,$$

wherein $I_k$ is a current of the selected connected phase, $V_k$ is a voltage of the selected connected phase and $K_{ijkl}$ is a characteristic constant for a mutual inductance between the phases of the generator and an inductance of the load.

* * * * *